United States Patent
Shiokawa et al.

(10) Patent No.: US 10,861,093 B2
(45) Date of Patent: Dec. 8, 2020

(54) BEHAVIOR INFORMATION COLLECTION SYSTEM

(71) Applicant: Nomura Research Institute Ltd., Tokyo (JP)

(72) Inventors: Yusuke Shiokawa, Tokyo (JP); Eiko Miyamae, Tokyo (JP); Naoharu Sasaki, Tokyo (JP); Ryota Koshirakawa, Tokyo (JP); Yuto Tanaka, Tokyo (JP); Rina Oishi, Tokyo (JP)

(73) Assignee: NOMURA RESEARCH INSTITUTE LTD., Tokyo (JP)

( * ) Notice: Subject to any disclaimer, the term of this patent is extended or adjusted under 35 U.S.C. 154(b) by 0 days.

(21) Appl. No.: 16/366,650

(22) Filed: Mar. 27, 2019

(65) Prior Publication Data

US 2019/0295160 A1    Sep. 26, 2019

Related U.S. Application Data

(63) Continuation of application No. PCT/JP2017/039149, filed on Oct. 30, 2017.

(30) Foreign Application Priority Data

Nov. 7, 2016  (JP) ................................ 2016-217311

(51) Int. Cl.
*G06Q 40/00* (2012.01)
*G06Q 40/02* (2012.01)
(Continued)

(52) U.S. Cl.
CPC ....... *G06Q 40/02* (2013.01); *G06F 16/24575* (2019.01); *G06F 16/252* (2019.01);
(Continued)

(58) Field of Classification Search
CPC ..................................................... G06Q 40/02
(Continued)

(56) References Cited

U.S. PATENT DOCUMENTS 5,673,691 A * 10/1997 Abrams ................ G06F 15/025
                                                                600/300
8,301,501 B1 * 10/2012 Glaeser .................. G06Q 20/20
                                                                705/17
(Continued)

FOREIGN PATENT DOCUMENTS

JP       2003-288480        10/2003
JP        2003288480      * 10/2003
(Continued)

OTHER PUBLICATIONS

Money Forward MD., Money Forward, Inc. <URL: http://moneyforward.com/>; Apr. 11, 2019; pp. 1-3.
(Continued)

*Primary Examiner* — Samica L Norman

(57) ABSTRACT

A behavior information collection system includes a goal DB for holding information regarding a goal for each user, and a scenario DB for holding a scenario for inquiring of each user content of a behavior when the each user has performed the behavior and information of a scenario trigger. When there is information of a time detected in a mobile terminal and/or a location position, which meets a condition of each scenario trigger regarding the user, the behavior information collection system acquires the corresponding scenario from the scenario DB, has a conversation based on the scenario, records the content of the behavior grasped on the basis of content of the response in association with the user, and performs processing necessary for achieving a goal on the basis of the content of the response.

4 Claims, 12 Drawing Sheets

(51) Int. Cl.
   *H04W 4/029* (2018.01)
   *G06F 16/2457* (2019.01)
   *G06F 16/25* (2019.01)
   *H04L 29/08* (2006.01)
   *G06Q 30/02* (2012.01)

(52) U.S. Cl.
   CPC ............. *G06Q 30/02* (2013.01); *H04L 67/22* (2013.01); *H04W 4/029* (2018.02)

(58) Field of Classification Search
   USPC ........ 705/35, 14.66, 17, 7.29, 36 R; 706/20; 455/456.3; 600/300
   See application file for complete search history.

(56) References Cited

U.S. PATENT DOCUMENTS

| | | | |
|---|---|---|---|
| 9,727,910 B1* | 8/2017 | Wu | G06Q 40/02 |
| 2003/0120572 A1* | 6/2003 | Coventry | G06Q 40/00 |
| | | | 705/35 |
| 2007/0239637 A1* | 10/2007 | Paek | G06N 20/00 |
| | | | 706/20 |
| 2011/0208630 A1* | 8/2011 | Hazzani | G06Q 40/02 |
| | | | 705/35 |
| 2013/0030925 A1* | 1/2013 | Calman | G06Q 30/02 |
| | | | 705/14.66 |
| 2015/0081405 A1* | 3/2015 | Ross | G06Q 50/01 |
| | | | 705/14.1 |
| 2015/0133163 A1* | 5/2015 | Kitamura | G06Q 30/02 |
| | | | 455/456.3 |
| 2015/0220923 A1* | 8/2015 | Vasant Akole | G06Q 20/405 |
| | | | 705/44 |
| 2015/0278829 A1* | 10/2015 | Lu | H04L 67/20 |
| | | | 705/7.29 |
| 2016/0180465 A1* | 6/2016 | Deperro | G06Q 40/06 |
| | | | 705/36 R |
| 2016/0247228 A1* | 8/2016 | Connolly | G06Q 40/06 |
| 2016/0321935 A1 | 11/2016 | Mohler et al. | |
| 2018/0277013 A1* | 9/2018 | Van Halteren | G09B 19/00 |

FOREIGN PATENT DOCUMENTS

| | | | |
|---|---|---|---|
| JP | 2006-260263 | | 9/2006 |
| JP | 2006260263 | * | 9/2006 |
| JP | 2016-522496 | | 7/2016 |
| WO | WO2014/129159 A1 | | 8/2014 |

OTHER PUBLICATIONS

International Search Report for PCT/JP2017/039149; dated Jan. 16, 2018.

* cited by examiner

BEHAVIOR INFORMATION COLLECTION SYSTEM

BACKGROUND

Technical Field

The present invention relates to a technology of collecting information of a behavior history of a user, and in particular to a technology effective when applied to a behavior information collection system for a behavior that cannot be automatically grasped by an information processing system.

Related Art

For example, there are needs to grasp content of a consumption behavior such as where and what a user bought as information to be used for marketing. In a case where the consumption behavior is an electronic commerce (EC) performed via an EC site, a business owner operating the EC site can easily grasp the content of the consumption behavior from a transaction history, an access history, or the like. Further, in a case where the consumption behavior is a purchase in a retail store, the retail store can grasp the content of the consumption behavior from data of a point of sale (POS) system or the like, for example. Further, in a household accounts book service used via an application or a web site on a mobile terminal such as a smartphone (for example, "Fully automatic household accounts book money forward", [online], Money Forward, Inc. [Search on Oct. 14, 2016], Internet <URL: http://moneyforward.com/>), the content of the consumption behavior can be grasped on the basis of purchase information or balance information input by the user.

In relation to the grasping of content of a consumption behavior, JP 2006-260263 A discloses, for example, a questionnaire execution system capable of obtaining a correct questionnaire result without impairing answer motivation of people in the questionnaire, as a technology of asking a user a question and prompting the user to input information. Here, a server transmits question information stored in association with a terminal identification information and position information of a mobile phone to the corresponding mobile phone and receives answer information attached with the terminal position information from the mobile phone. Then, in a case where the terminal position information attached to the received answer information matches the position information associated with the transmitted question information, the received answer information is stored as a valid answer.

SUMMARY

The content of the consumption behavior of the user can be automatically grasped to some extent by the mechanism such as the EC site, the POS system, or the household accounts book service, as described above. However, for example, the EC site can grasp only the purchase at the EC site and the retail store can grasp only the consumption behavior within the retail store, or a chain, a group or the like of the retail store. Therefore, for example, it is difficult to automatically acquire and integrally grasp consumption behaviors at other EC stores and retail stores.

To cope with the difficulty, the content of the consumption behavior can be integrally grasped regardless of the store or the like where the user has performed the consumption behavior if the user inputs the content of the consumption behavior to the household accounts book service or the like. However, in this case, the user needs to actively input the consumption behavior, and there is a problem of difficulty in expecting appropriate input unless the user is motivated for the input and the user can perform the input efficiently and in a natural way.

In this respect, for example, according to the technology described in JP 2006-260263 A, the answer can be obtained without impairing the answer motivation of a person who intends to answer the questionnaire. However, in a case of considering application to a mechanism for causing the user to input content of a consumption behavior, expectation of the input is difficult in a case where there is no motivation to input and record the content of the consumption behavior itself. Further, the question is presented to the user at the timing when the question information is transmitted from the server, and an appropriate question is not presented in a timely manner at the timing when the user performs the consumption behavior. Therefore, the user cannot always input the content of the consumption behavior in a natural way.

Therefore, an object of the present invention is to provide a behavior information collection system capable of collecting content of a consumption behavior and the like of a user efficiently and in a natural way.

The above and other objects and novel characteristics of the present invention will become clear from the description of the present specification and the accompanying drawings.

An outline of representative inventions of inventions disclosed in the present application will be briefly described as follows.

A behavior information collection system according to a representative embodiment of the present invention is a behavior information collection system that collects information regarding a behavior of a user, and includes a goal database that holds information regarding a goal associated with the behavior for the each user, and a scenario database that holds a scenario regarding content of a conversation for inquiring of the each user content of the behavior when the each user has performed the behavior, and information of a scenario trigger including a condition of a time and a place of the user serving a trigger to start a conversation regarding the scenario.

Then, in a case where there is information of a time detected in a mobile terminal held by the user and/or a location position of the mobile terminal, the information meeting the condition of the each scenario trigger regarding the user, the behavior information collection system acquires the scenario corresponding to the met scenario trigger from the scenario database, has a conversation based on the acquired scenario by displaying a message and inputting a response from the user on the mobile terminal, records the content of the behavior grasped on the basis of content of the response in association with the user, and performs processing necessary for achievement of the goal in the user on the basis of the content of the response.

An effect obtained by the representative inventions of inventions disclosed in the present application is as follows.

That is, according to a representative embodiment of the present invention, content of a consumption behavior and the like of a user can be collected efficiently and in a natural way.

DETAILED DESCRIPTION

Figure 1:
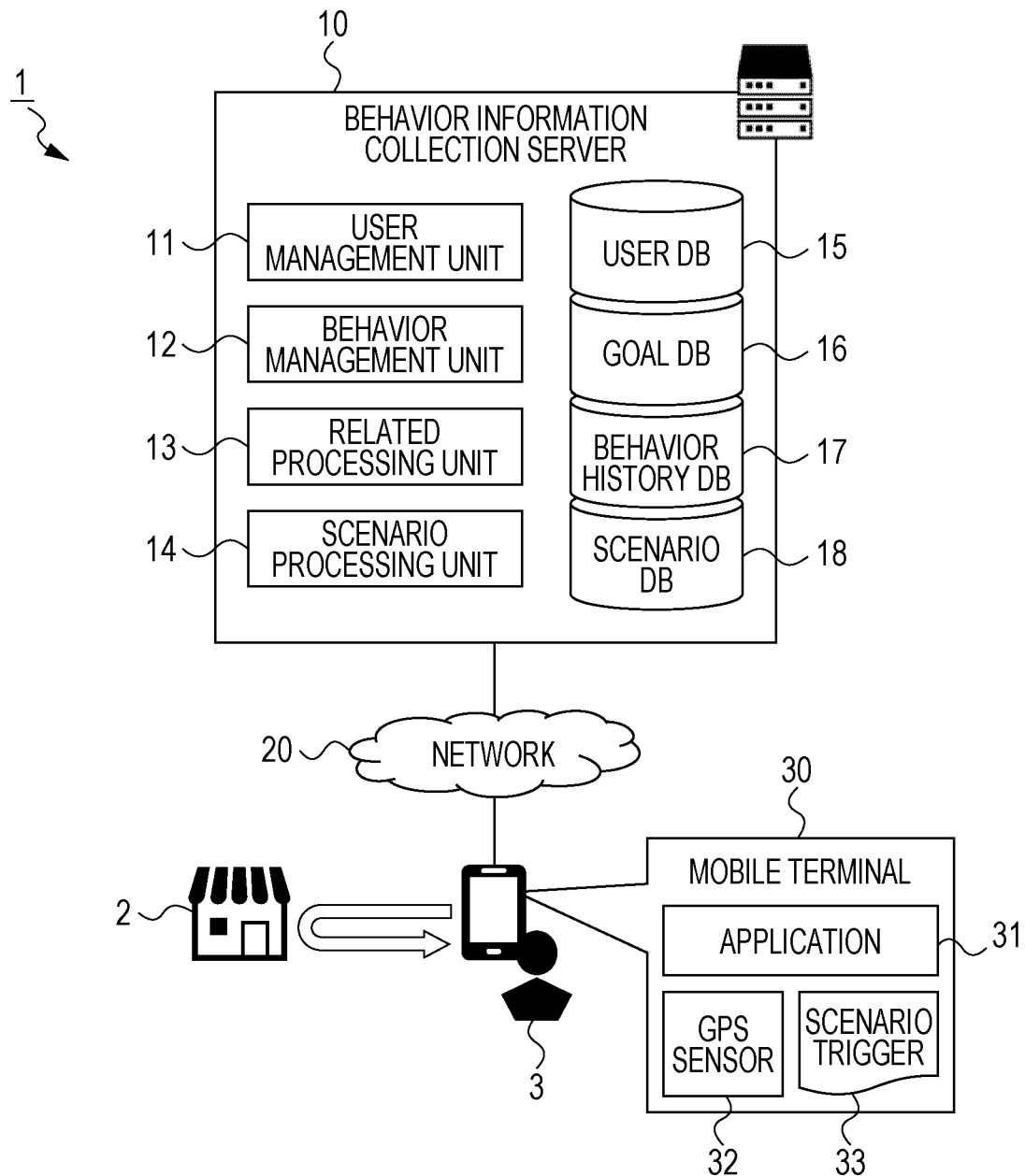
FIG. 1 is a diagram illustrating an outline of a configuration example of a behavior information collection system that is an embodiment of the present invention.

Hereinafter, embodiments of the present invention will be described in detail with reference to the drawings. In all the drawings for describing the embodiments, the same reference numerals are attached in principle to the same parts, and repeated description thereof will be omitted. Meanwhile, in the description of the other drawings, the parts described with reference numerals in a certain drawing may be referred to by attaching the same reference numerals though not illustrated again.

A behavior information collection system as one embodiment of the present invention associates a consumption behavior of a user with daily "savings" toward a goal set by the user, motivates achievement of the goal by the "savings", captures that some sort of consumption behavior has been performed in a timely manner, and gets and grasps content of the consumption behavior for performing the "savings".

<System Configuration>

FIG. 1 is a diagram illustrating an outline of a configuration example of a behavior information collection system that is an embodiment of the present invention. A behavior information collection system 1 includes, for example, a behavior information collection server 10 and a mobile terminal 30 such as a smartphone held by each user 3, the mobile terminal 30 being connectable to the behavior information collection server 10 via a network 20 such as the Internet.

The behavior information collection server 10 is a server system including, for example, a server device or a virtual server constructed on a cloud computing service, and collects and records/accumulates a behavior of each user 3 and executes processing ("savings" in the present embodiment) related to motivation for the user 3 for inputting content of the behavior. In addition, the behavior information collection server 10 performs processing regarding a series of conversations (scenario) for getting the content of the behavior out of the user 3.

Note that, in the present embodiment, the "behavior" is a behavior that can be roughly specified by time and place for each user 3 and assumes, but is not limited to, a consumption behavior of a daily purchase of the user 3 in an actual store 2 such as a retail store (for example, a purchase in a neighborhood convenience store on the way home). A purchase by electronic commerce at an EC site performed on a computer at home, for example, may be a target of the behavior as long as the purchase can be roughly specified by time and place. Further, as will be described later, the behavior is not limited to money expenditure by purchase and may include a behavior related to money acquisition such as overtime work.

In the present embodiment, each user 3 who performs a behavior to be grasped holds the mobile terminal 30. The mobile terminal 30 such as a smartphone usually includes a global positioning system (GPS) sensor 32 and can grasp position information in real time. Therefore, for example, the mobile terminal 30 can grasp entering/leaving the store 2, and the like. In the present embodiment, the position information is grasped by the GPS sensor 32. However, the position information may be grasped using short distance wireless communication between the mobile terminal 30 and a transmission/reception device of a Bluetooth (registered trademark) beacon or the like.

A dedicated application 31 installed in the mobile terminal 30 determines whether time and position information grasped by the mobile terminal 30 meets a condition that serves as a trigger for starting a conversation based on a specific scenario. This condition is recorded as a scenario trigger 33 in a memory (not illustrated) or the like, for example. In a case where the time and position information meets the condition registered in the scenario trigger 33, the application 31 starts a conversation based on the scenario with the user 3 via a chat or a messaging user interface as will be described below. Then, the application 31 grasps content of the behavior of the user 3 on the basis of content of the conversation and transmits the grasped content to the behavior information collection server 10.

The behavior information collection server 10 executes an operating system (OS), a database management system (DBMS) expanded on a memory, middleware such as a web server program, and a software operating on the middleware by a central processing unit (CPU, not illustrated) to realize functions of units to be described below. In the present embodiment, the behavior information collection server 10 includes the units such as a user management unit 11, a behavior management unit 12, a related processing unit 13, and a scenario processing unit 14 implemented as software, as illustrated in FIG. 1. Further, the behavior information collection server 10 includes data stores such as a user database (DB) 15, a goal DB 16, a behavior history DB 17, and a scenario DB 18 recorded in a storage device such as a hard disk drive (HDD, not illustrated).

The user management unit 11 has a function to manage account information, attribute information, and the like related to each user 3 who uses a service by the behavior information collection system 1. For example, the user management unit 11 registers an account of a target user 3 to the user DB 15 and further registers the attribute information and the like on the basis of user registration operation on the application 31 of the mobile terminal 30. Further, the user management unit 11 registers content of a goal set by the user 3 to the goal DB 16 on the basis of goal setting and registration operation on the application 31.

The behavior management unit 12 has a function to acquire information regarding a "behavior" of the user 3 grasped by the application 31 of the mobile terminal 30 and record the information in the behavior history DB 17 as history information. The information regarding the behavior may be analyzed and the content may be grasped, and the related processing unit 13 may perform related processing such as "savings" on the basis of the grasped content. The related processing unit 13 has a function to execute the related processing. Since content of the related processing is not particularly limited, implementation content is different according to the content of the related processing. For example, in a case where the related processing is "savings" as in the present embodiment, the related processing unit 13 enables automatic processing of transfer and remittance to a savings account by being connected to an online system or a web site of a bank (not illustrated).

The scenario processing unit 14 has a function to perform processing regarding management and execution of a scenario for getting the content of the behavior out of the user 3 via the application 31 of the mobile terminal 30. For example, the scenario processing unit 14 registers and modifies the scenario in the scenario DB 18 on the basis of operation by an operator, an administrator, or the like of the behavior information collection system 1, who has accessed the system using a client terminal (not illustrated).

Further, the scenario processing unit 14 registers information of the scenario trigger 33 for starting a conversation based on the scenario in association with the scenario. As described above, the scenario trigger 33 is transmitted to and held in the mobile terminal 30 of the corresponding user 3, for example. As a result, each mobile terminal 30 can detect occurrence of the condition regarding the scenario trigger 33. The detection of the occurrence of the condition or the like regarding the scenario trigger 33 is transmitted to the behavior information collection server 10 via the network 20. Then, the scenario processing unit 14 has a conversion based on the scenario with the user 3 via the user interface of the application 31 of the mobile terminal 30 on the basis of the content of the scenario corresponding to the scenario trigger 33 registered in the scenario DB 18.

<User Interface>

In the present embodiment, assume that the user 3 sets in advance a goal of how much and for what purpose the user 3 saves money via the application 31 of the mobile terminal 30, and saves an amount saved in daily purchases (consumption behaviors) as processing necessary for achieving the goal. Thus, the content of the consumption behavior is gotten in a natural way of answering to an inquiry in a conversation form based on the scenario in the application 31, as the information necessary for performing the processing of savings with achievement of a goal amount of savings as motivation.

Figure 2:
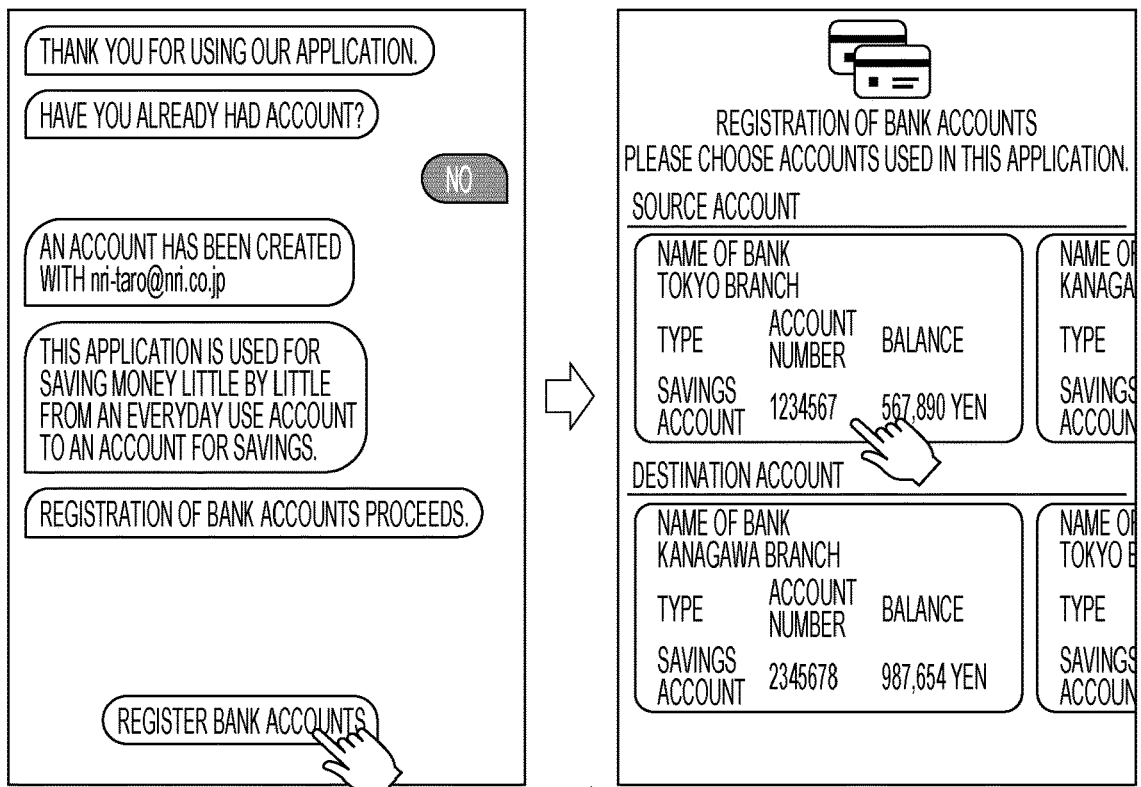
FIG. 2 is a diagram illustrating an outline of screen examples of account registration of a user provided by an application of a mobile terminal in an embodiment of the present invention.

FIG. 2 is a diagram illustrating an outline of screen examples of account registration of a user provided by the application 31 of the mobile terminal 30 in the behavior information collection system 1 of the present embodiment. In the present embodiment, preliminary account registration by the user 3 is also performed via a conversation based on a scenario (account registration scenario). FIG. 2 illustrates an example of a screen of the conversation based on the account registration scenario displayed on a display having a touch panel function provided in the mobile terminal 30. The screen of the conversion is a user interface similar to a general chatting or messaging application, and a flow of the conversation is chronologically displayed from the top to the bottom. A balloon on the left side is a conversation (mainly inquiry) outputted by the application 31 and a balloon on the right side is a conversation (response) input by the user 3 who holds the mobile terminal 30.

In the upper left screen example in FIG. 2, the application 31 firstly inquires whether the user 3 has already had an account, and displays a conversion that an account has been newly created because of a reply that the user 3 has no account. As for the account registration method, a known technology such as identification confirmation by two-step authentication can be appropriately used.

Further, if free input is allowed when the user 3 inputs a response ("No" in the example in FIG. 2), homogeneity of input content cannot be maintained, an input load increases, and the scenario diverges, while a freedom of input increases. Therefore, in the present embodiment, the conversation on the user 3 side is limited to a replay of an alternative answer of "Yes" or "No" or an input of selection from among one or more predetermined answer candidates as far as possible. Further, if necessary, the user 3 can input the conversion by simply specifying only a numerical value of an amount of money, the number, or the like. With such a simple input interface, the input of the answer is made efficient and the motivation to the achievement of the goal of the user 3 is not hindered by the load regarding the input.

Thereafter, when the user 3 specifies a response "register a bank account" to an inquiry to proceed with registration of a bank account from the application 31, a registration screen of the bank account as illustrated in the upper right screen is displayed. Here, for example, information of bank accounts of the user 3 is acquired and displayed via a login screen to a bank account (not illustrated) using a known technology such as OAuth 2.0 as appropriate. The user 3 selects a source account and a destination account (for savings) from among the information of bank accounts, so that information of a daily use account and an account for savings is registered, as illustrated in the lower left screen example. In the lower right screen example in FIG. 2, registration of the bank accounts by the above operation is displayed as a conversation.

Figure 3:
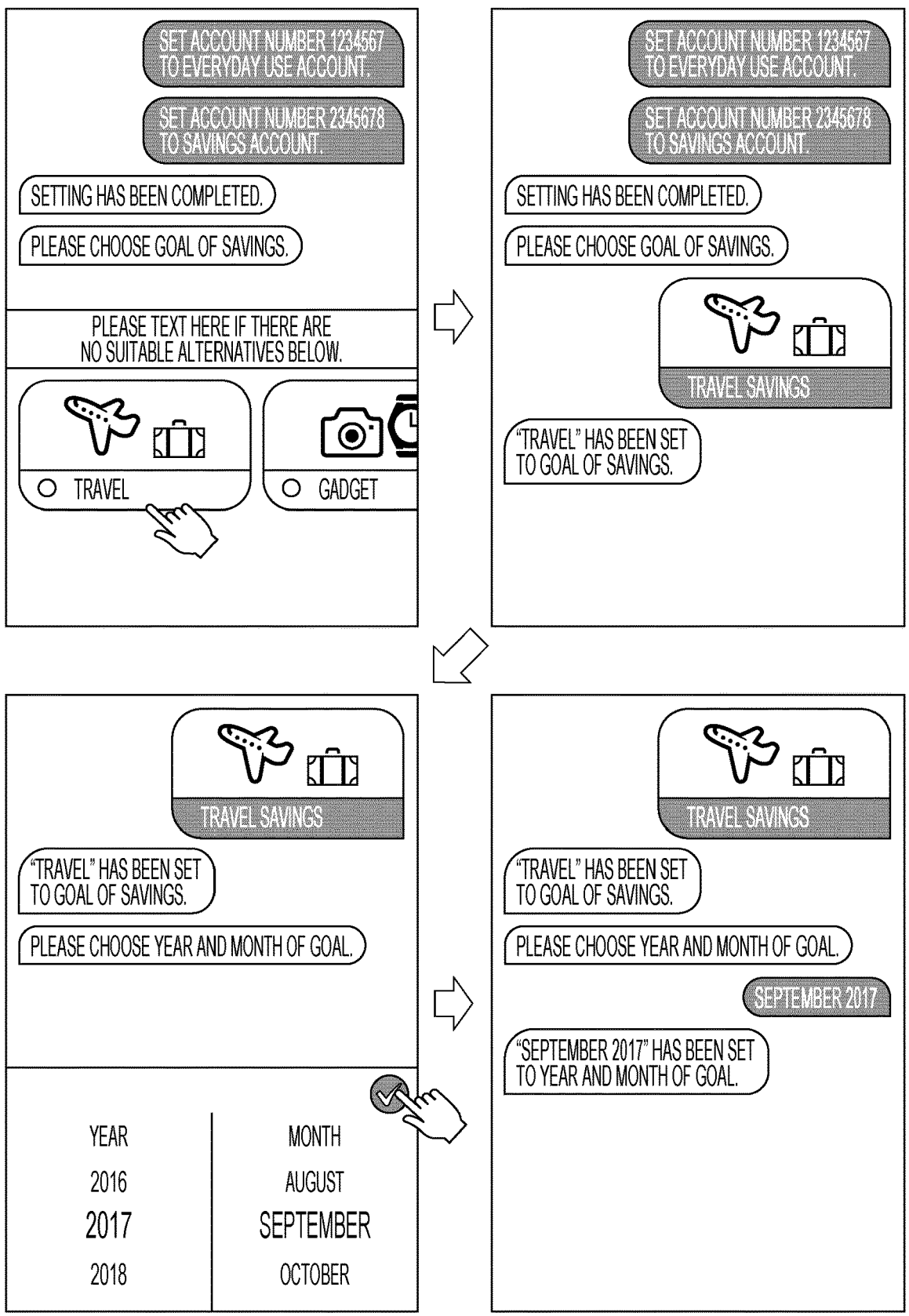
FIG. 3 is a diagram illustrating an outline of screen examples of goal setting provided by an application of a mobile terminal in an embodiment of the present invention.

FIG. 3 is a diagram illustrating an outline of screen examples of goal setting provided by the application 31 of the mobile terminal 30 in the behavior information collection system 1 of the present embodiment. The upper left screen example in FIG. 3 illustrates a screen for selecting or inputting a goal ("goal of savings") after the registration of the bank accounts. Then, the upper right screen example illustrates that the user 3 has selected "travel" from among options and the "travel" has been set as the goal. Further, the lower left screen example illustrates a screen for specifying a deadline of the goal ("year and month of the goal"). Then, the lower right screen example illustrates that the user 3 has specified "September 2017" and the "September 2017" has been set as the year and month of the goal as a conversation.

Figure 4:
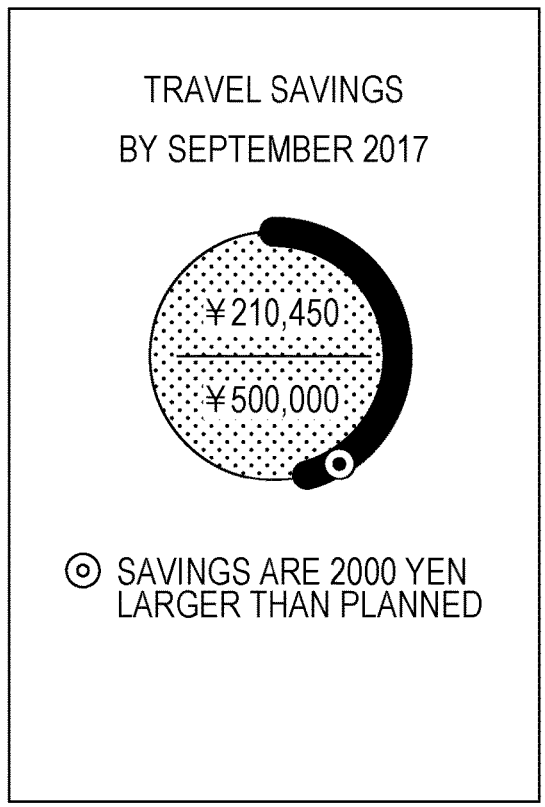
FIG. 4 is a diagram illustrating an outline of screen examples for managing a goal achievement status provided by an application of a mobile terminal in an embodiment of the present invention.
Figure 4:
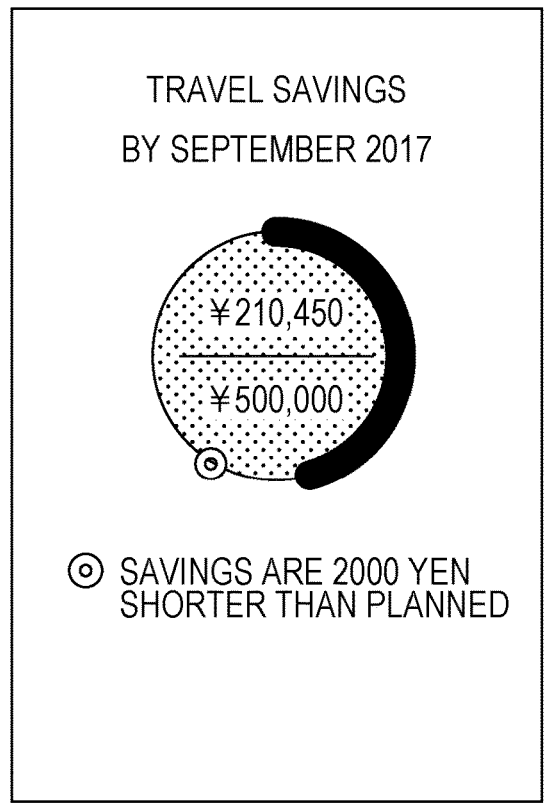

FIG. 4 is a diagram illustrating an outline of screen examples for managing a goal achievement status provided by the application 31 of the mobile terminal 30 in the behavior information collection system 1 of the present embodiment. In FIG. 4, both the right and left examples illustrate the goal amount of "¥500,000" as a circumference of a circle in the center and a saving amount up to the present "¥210,450" as an arc of a bold line. By making the ratio of the length of the arc to the circumference the same as the ratio of the saving amount up to the present to the goal amount, the achievement of the savings can be easily and visually grasped.

Likewise, the example in FIG. 4 illustrates a planned saving amount at present as a double circle on the circumference. The left figure illustrates that the saving amount exceeds the planned saving amount and the right figure illustrates that the saving amount falls below the planned saving amount. The motivation (or a sense of danger) of the user 3 may be increased by performing budget control of the goal amount achievement status in the visually recognizable manner as described above.

Figure 5:
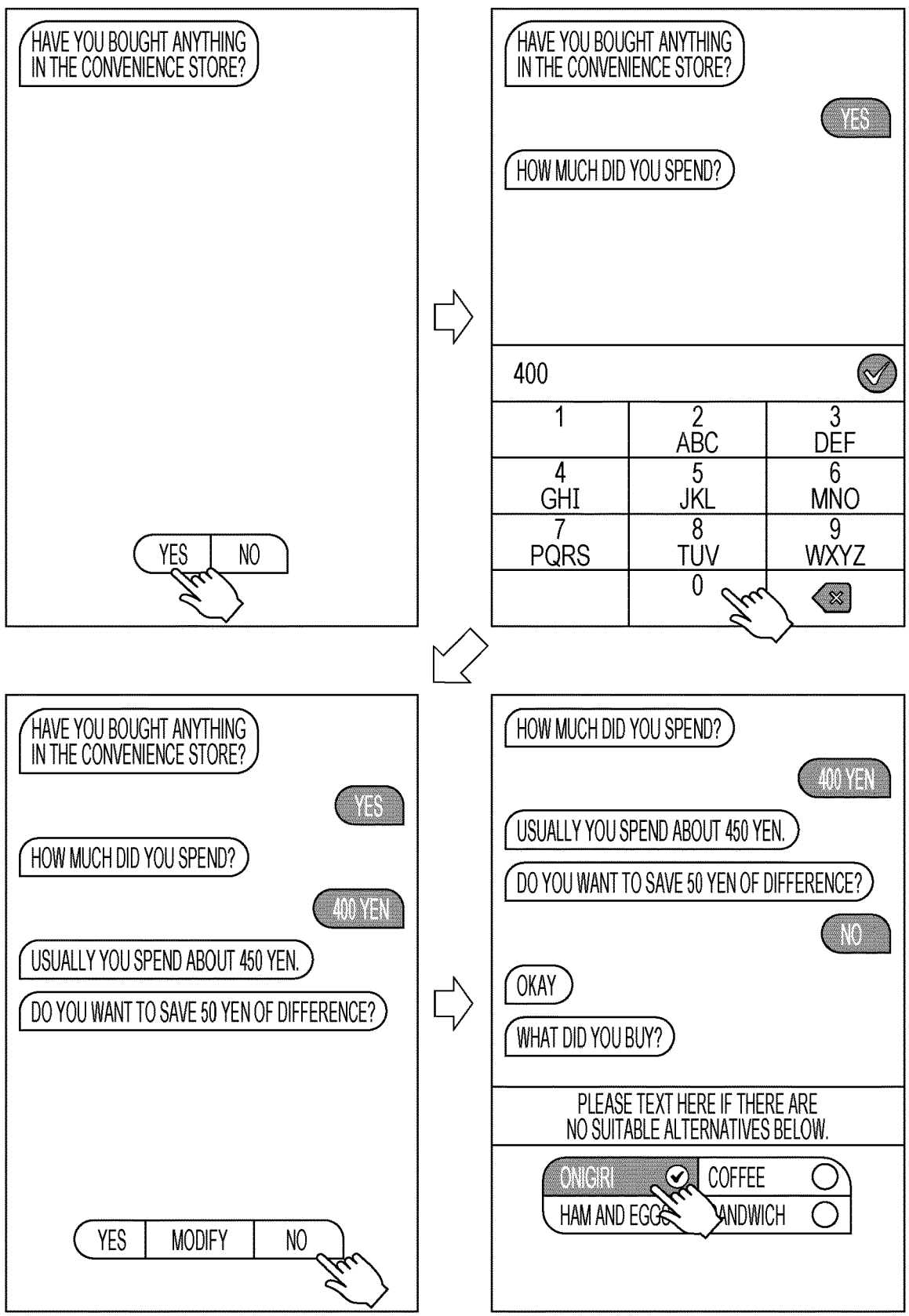
FIG. 5 is a diagram illustrating an outline of screen examples of inquiring content of a consumption behavior provided by an application of a mobile terminal in an embodiment of the present invention.

FIG. 5 is a diagram illustrating an outline of screen examples of inquiring the content of the consumption behavior provided by the application 31 of the mobile terminal 30 in the behavior information collection system 1 of the present embodiment. Here, for example, assume that a scenario ("convenience store scenario") for saving a saved expenditure in a case where the user 3 saves lunch money more than usual when purchasing a lunch box at a convenience store in lunch time is set in advance in the scenario DB 18 of the behavior information collection server 10. In this case, as the scenario trigger 33 to be held on the mobile terminal 30, content for grasping that the user 3 comes out from a specific store 2 such as a neighborhood convenience store during lunch time is set.

Then, in a case where the application 31 detects that the user 3 has come out of the store 2 after entering the store 2 by the GPS sensor 32 of the mobile terminal 30, a conversation with the user 3 as a conversation partner is automatically started on the basis of the corresponding scenario ("convenience store scenario"). In this scenario, first, as illustrated on the upper left and upper right screen examples in FIG. 5, whether the user 3 has bought something in the store 2 and how much the user has spent in the case of having bought something are inquired. Then, as illustrated in the lower left screen example, a difference (50 yen) from an average use amount (450 yen) grasped on the basis of a past behavior history (purchase history) is calculated, and whether to save this difference in amount is inquired. Further, as illustrated in the lower right screen example, what the user 3 has bought is inquired.

Here, content of subsequent conversations is set according to content of answer by the user 3 ("Yes" or "No", the amount of money, or the like). That is, in the scenario, as will be described below, conversation content is predefined in such a manner as to cover all of branch patterns of the conversation. In this way, the content of the consumption behavior can be acquired in a natural way by inquiring the user 3 information regarding the content of the consumption behavior as the information necessary for savings and causes the user 3 to input the information.

Although not illustrated, in a case where the user 3 selects saving the saved amount in the above-described conversation based on the scenario, for example, the related processing unit 13 of the behavior information collection server 10 performs at a predetermined timing the processing of transfer or remittance from the user's everyday use account to the user's account for savings.

Further, in the example in FIG. 5, the scenario of saving the saved expenditure when the user purchases something at the store 2 such as a convenience store is adopted. However, the trigger to perform the saving is not limited to the case of saving the expenditure. For example, a scenario of saving in advance money that will be acquired in the future (overtime money) in a case of performing overtime work may be adopted. Further, in the example in FIG. 5, after the user 3 performs the consumption behavior, the content is gotten and the money is saved. However, the present invention is not limited to the example. For example, in the budget control of the goal amount achievement status illustrated in the example in FIG. 4, in the case where the achievement status is worse than the plan, a predetermined scenario is activated at the timing when the user enters the store 2 such as a convenience store such that a conversation prompting the user to save money may be performed in advance.

<Flow of Processing>

Figure 6:
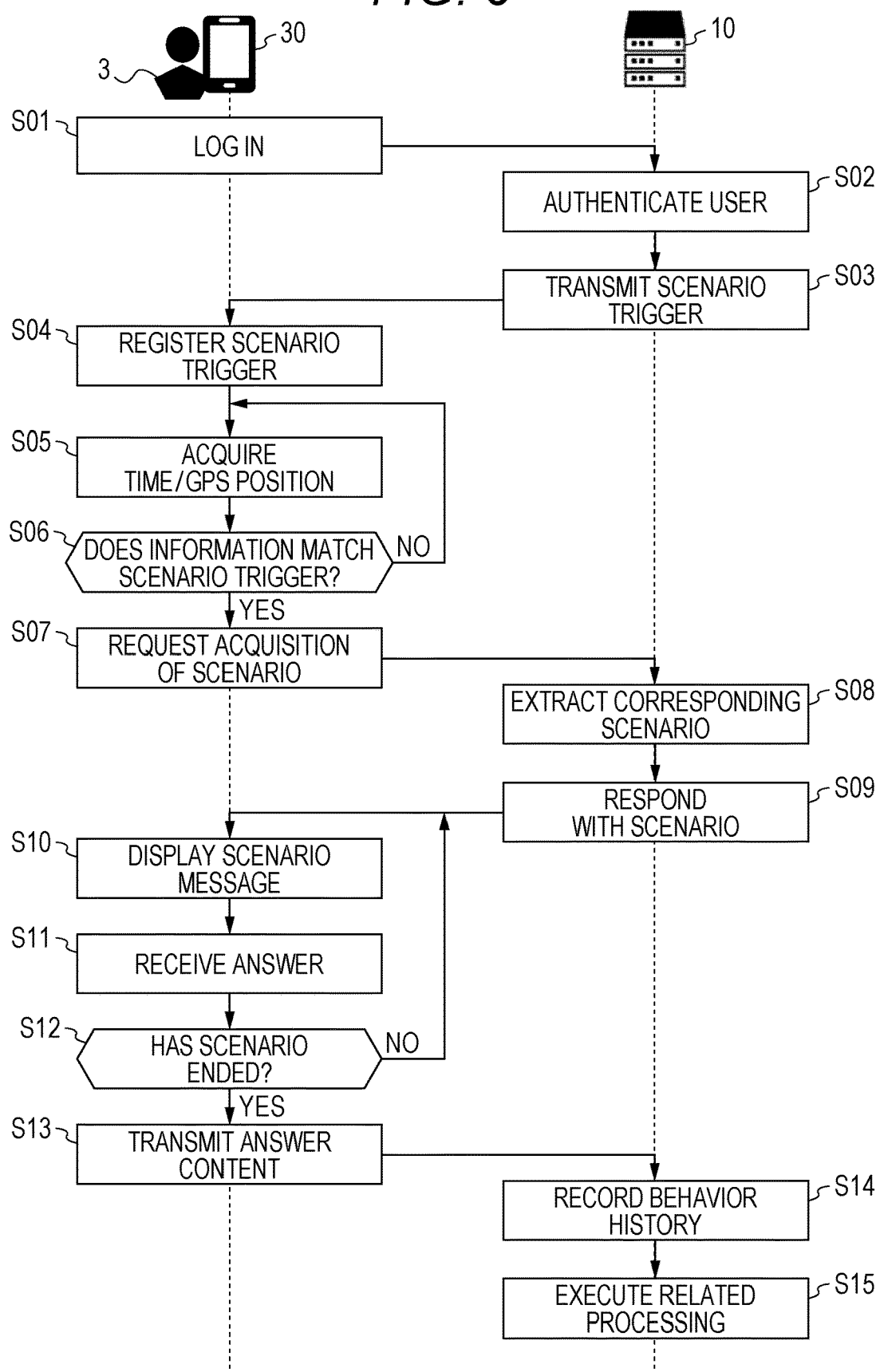
FIG. 6 is a diagram illustrating an outline of an example of a flow of processing of grasping behavior content via a conversation based on a scenario in an embodiment of the present invention.

FIG. 6 is a diagram illustrating an outline of an example of a flow of processing of grasping behavior content via a conversation based on a scenario in the present embodiment. Here, assume that account information is already registered in the user DB 15 of the behavior information collection server 10, and the goal amount of savings as the basis of motivation is registered in the goal DB 16 for the target user 3.

First, the user 3 activates the application 31 on the mobile terminal 30 that he holds and logs in a service provided by the behavior information collection system 1 (S01). In the behavior information collection server 10, the user management unit 11 performs user authentication processing by referring to the user DB 15 (S02). In a case where the user authentication is successful, the scenario processing unit 14 acquires the information of the scenario trigger 33 corresponding to the target user 3 from the scenario DB 18 and transmits the scenario trigger 33 to the mobile terminal 30 (S03). The mobile terminal 30 records and registers the transmitted scenario trigger 33 in a memory or the like (S04). Note that only a difference in the scenario trigger 33 when update or the like occurs may be transmitted rather than all the scenario trigger 33 is transmitted at each login.

Thereafter, the mobile terminal 30 acquires the time and the position information detected by the GPS sensor 32 (S05) and determines whether there is information meeting the condition of the scenario trigger 33 registered in step S04 (S06). In a case where there is no information meeting the condition (S06: No), the processing returns to step S05 and continues acquisition of the time and the position information. Acquisition of the time and the position information may be performed at appropriate intervals of every fixed time. In a case where there is information meeting the condition of the scenario trigger 33 (S06: Yes), the application 31 requests the behavior information collection server 10 to acquire the content of the scenario corresponding to the met scenario trigger 33 (S07).

In the behavior information collection server 10 that has received the request, the scenario processing unit 14 extracts the information of the scenario corresponding to the target scenario trigger 33 from the scenario DB 18 (S08) and responds with the information to the mobile terminal 30 (S09). Here, the scenario associated with the target user 3 is extracted from the scenario DB 18. Furthermore, at this time, as will be described below, a type of a specific conversation (message) in the scenario may be set according to the attribute information of the target user 3, the goal achievement status, or the like.

For example, in a case where the current achievement has not reached the goal in the budget control for the goal amount of savings, a positive expression or a negative expression, or a serious tone or a gentle tone, or the like may be switched even in a case of outputting a message of the same content. This switching may be set by the user 3 as desired or may be automatically set by the scenario processing unit 14. In addition to the expression and tone, whether the saving amount proposed to the user 3 is set to be larger (stricter) or smaller (gentler) for each behavior may be switched.

In the mobile terminal 30 that has acquired the information regarding the content of the scenario, the application 31 displays the conversation (message) regarding the scenario on the screen as illustrated in FIG. 2 for each unit of conversation (S10) and receives the input of answer as needed from the user 3 (S11). Then, whether the scenario has ended is determined (S12). In a case where the scenario has not ended (S12: No), the processing returns to step S10 and further displays a subsequent scenario message according to the content of the scenario.

In a case where the scenario has ended in step S12 (S12: Yes), the answer content input by the user 3, that is, the information regarding the content of the consumption behavior of the user 3 is transmitted to the behavior information collection server 10 (S13). In the behavior information collection server 10 that has received the transmission of the information, the behavior management unit 12 analyzes the behavior content as needed and then records the content of the consumption behavior in the behavior history DB 17 as a behavior history (S14). Further, in a case where the related processing such as "savings" needs to be performed, the related processing unit 13 executes the related processing (S15), and the series of processing is terminated.

Note that, in the example in FIG. 6, the application 31 of the mobile terminal 30 collectively acquires (downloads) the information regarding the content of the series of scenarios from the behavior information collection server 10 and determines the subsequent messages on the basis of the content of the scenario and the answer content from the user 3. However, an embodiment is not limited to the example. The scenario processing unit 14 of the behavior information collection server 10 may perform the determination of the subsequent messages based on the content of the scenario and the answer content from the user 3 each time it happens on the server side, and the application 31 of the mobile terminal 30 may perform only display of a determined message and transmission of answer by the user 3.

<Data Configuration>

Figure 7:
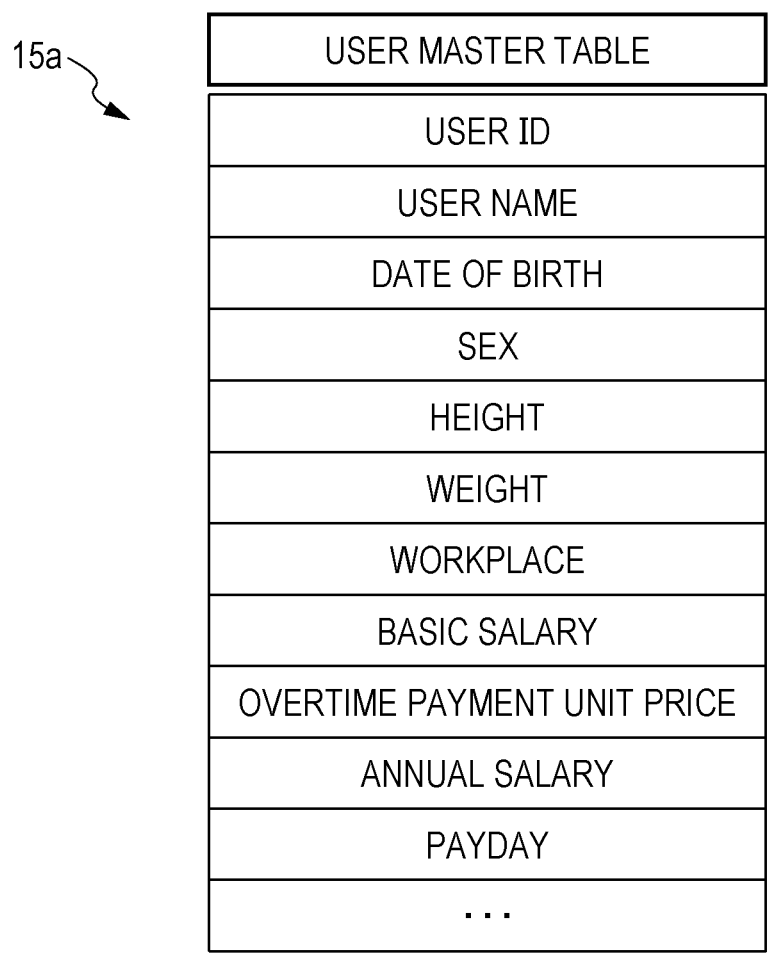
FIG. 7 is a diagram illustrating an outline of an example of a data configuration of a user master table included in a user DB in an embodiment of the present invention.

FIG. 7 is a diagram illustrating an outline of an example of a data configuration of a user master table included in the user DB 15 in the present embodiment. A user master table 15a is a table that holds master information of the user 3 who can use the service provided by the behavior information collection system 1. For example, the table includes items such as a user ID, a user name, a date of birth, a sex, a height, a weight, a workplace, a basic salary, an overtime payment unit price, an annual salary, and a payday.

The item of the user ID holds ID information for uniquely identifying each user 3. The item of the user name holds information of a name of the target user 3, and a display name such as a nickname. The items of the date of birth, sex, height, and weight hold information for grasping a physical condition as the attribute information of the target user 3. These items can be used, for example, in a case of setting a fitness-related goal such as diet in place of or in addition to the savings of the goal amount as in the present embodiment as motivation for inputting the consumption behavior.

The items of the workplace, basic salary, overtime payment unit price, annual salary, and payday hold information for grasping an income situation (money acquisition status) associated with employment of the target user 3. For example, the amount set/recommended as daily saving amount can be increased/decreased according to the annual salary. Further, by grasping the position of the workplace, it is determined whether or not overtime work is performed from position information detected by the GPS sensor 32 of the mobile terminal 30 and a time zone, and saving money in advance from the overtime money that will be acquired in the future can be urged, as described above. Further, information of an accumulated saving amount is recorded instead of transferring the saving amount associated with the daily consumption behaviors to the savings account each time it happens, and the accumulated saving amount may be collectively transferred to the savings account by monthly processing of the payday.

Figure 8:
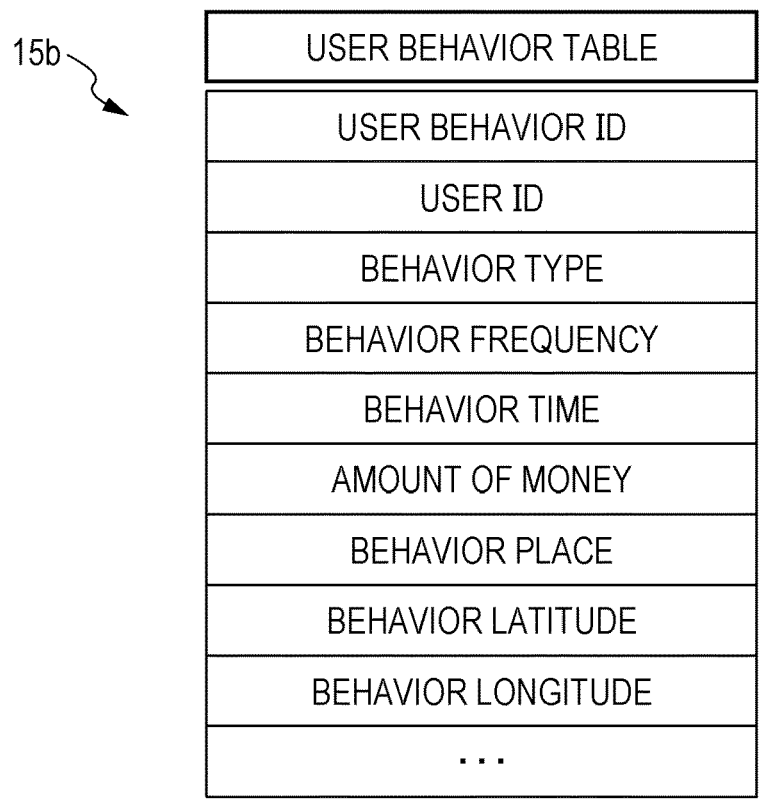
FIG. 8 is a diagram illustrating an outline of an example of a data configuration of a user behavior table included in a user DB in an embodiment of the present invention.

FIG. 8 is a diagram illustrating an outline of an example of a data configuration of a user behavior table included in the user DB 15 in the present embodiment. A user behavior table 15b is a table that registers/holds content of a behavior (in other words, a consumption behavior serving as a trigger for performing the related processing) collected/grasped in association with the related processing for achieving the goal ("savings" in the present embodiment) out of behaviors (consumption behaviors) daily performed by each user 3. For example, the table includes items such as a user behavior ID, a user ID, a behavior type, a behavior frequency, an amount of money, a behavior place, a behavior latitude, and a behavior longitude.

The item of the user behavior ID holds ID information for uniquely identifying each behavior of each user 3. The item of the user ID holds ID information for identifying the user 3 associated with a target user behavior. This value is registered in the above-described user master table 15a. The item of the behavior type holds information such as a code value for classifying class/type of the target user behavior. The classification may include, for example, a behavior related to expenditure of money such as a purchase of goods, a behavior related to acquisition of money such as overtime work, a behavior related to fitness, and the like.

The items of the behavior frequency and the behavior time hold information of an average frequency (for example, "○ times/day", "once every ○ days", or the like) at which the target user behavior is performed, and an average time and time zone. Further, the item of the amount of money holds information of an average income/expenditure in the target user behavior. The values of these items may be manually set by the user 3 or values that are statistically calculated on the basis of the information accumulated in the behavior history DB 17 may be automatically set or updated.

The item of the behavior place holds information such as a name for specifying the place where the target user behavior is performed. For example, the name of the store 2, the name of the workplace, or the like is set. The items of the behavior latitude and the behavior longitude hold information of the latitude and longitude of the place set to the item of the above-described behavior place. This information may be manually set by the user 3 or a value acquired by a general map service available via the network 20 on the basis of the content set to the item of the above-described behavior place may be automatically set.

Note that the behaviors registered in the user behavior table 15*b* may be manually registered by each user 3 or life log data of the user 3 accumulated by the mobile terminal 30 or another service may be analyzed by a predetermined technique and automatically extracted.

Figure 9:
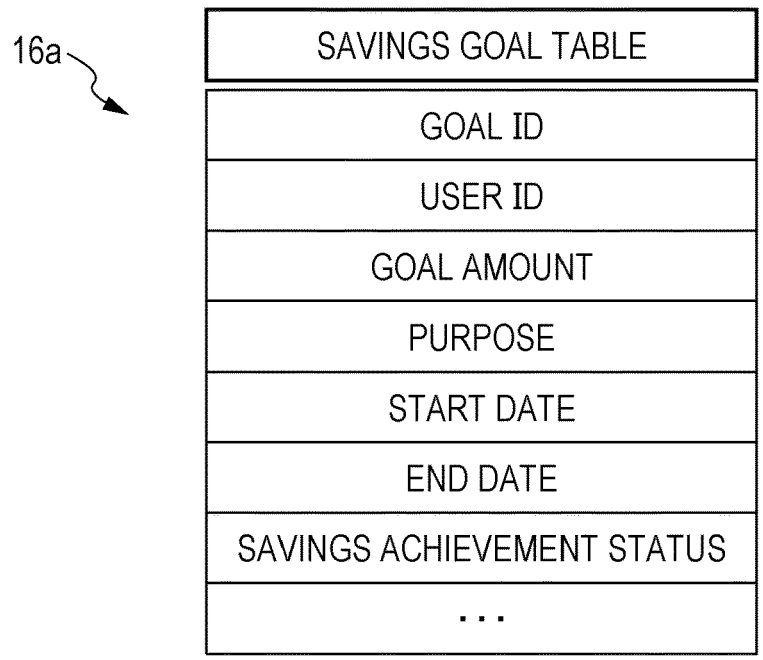
FIG. 9 is a diagram illustrating an outline of an example of a data configuration of a savings goal table included in a goal DB in an embodiment of the present invention.

FIG. 9 is a diagram illustrating an outline of an example of a data configuration of a savings goal table included in the goal DB 16 in the present embodiment. A savings goal table 16*a* is a table that holds the content regarding the goal (savings in the present embodiment) set by each user 3 and information of the achievement state of the goal. For example, the table includes items such as a goal ID, a user ID, a goal amount, a purpose, a start date, an end date, and a savings achievement status.

The item of the goal ID holds ID information for uniquely identifying each goal of each user 3. The item of the user ID holds ID information for identifying the user 3 associated with the target goal. This value is registered in the above-described user master table 15*a*. The items of the goal amount and the purpose hold information of the goal savings amount and the purpose of saving as the content of the target goal. As the item of the purpose, information such as a code value representing traveling, shopping, or the like can be specified, for example.

The items of the start date and the end date hold information of dates of start and end of a certain period when setting the certain period and aiming at achieving the goal. The item of the savings achievement status holds information of an achievement status of the goal at the present moment (in the present embodiment, how much the savings are progressing with respect to the goal amount). For example, the savings achievement status may be evaluated as an absolute value of a savings amount (or a difference from the goal amount) or may be evaluated as an achievement ratio of the savings to the goal amount.

Figure 10:
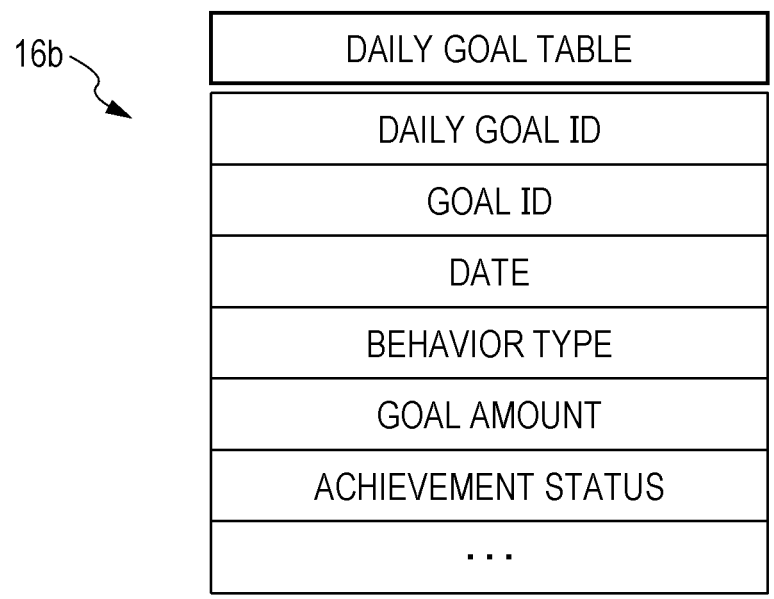
FIG. 10 is a diagram illustrating an outline of an example of a data configuration of a daily goal table included in a goal DB in an embodiment of the present invention.

FIG. 10 is a diagram illustrating an outline of an example of a data configuration of a daily goal table included in the goal DB 16 in the present embodiment. A daily goal table 16*b* is a table that holds information regarding goals at daily behavior levels for achieving the final goal set by each user 3. For example, the table includes items such as a daily goal ID, a goal ID, a date, a behavior type, a goal amount, and an achievement status.

The item of the daily goal ID holds ID information for uniquely identifying each daily goal of each user 3. The item of the goal ID holds ID information for specifying the final goal corresponding to the target daily goal. This value is registered in the savings goal table 16*a*. The item of the date holds information of a date scheduled to take a behavior related to the target daily goal or a date of a result. The item of the behavior type holds information such as a code value specifying the type of behavior related to the target daily goal. This value is registered in the above-described user behavior table 15*b*.

The items of the target amount and the achievement status hold information of the goal amount (the saving amount of a target date in the present embodiment) in the target daily goal and the achievement status of the goal (how much money saved with respect to the goal amount of the target date in the present embodiment). For example, the savings achievement status may be evaluated as an absolute value of a savings amount (or a difference from the goal amount) or may be evaluated as an achievement ratio of the savings to the goal amount.

Figure 11:
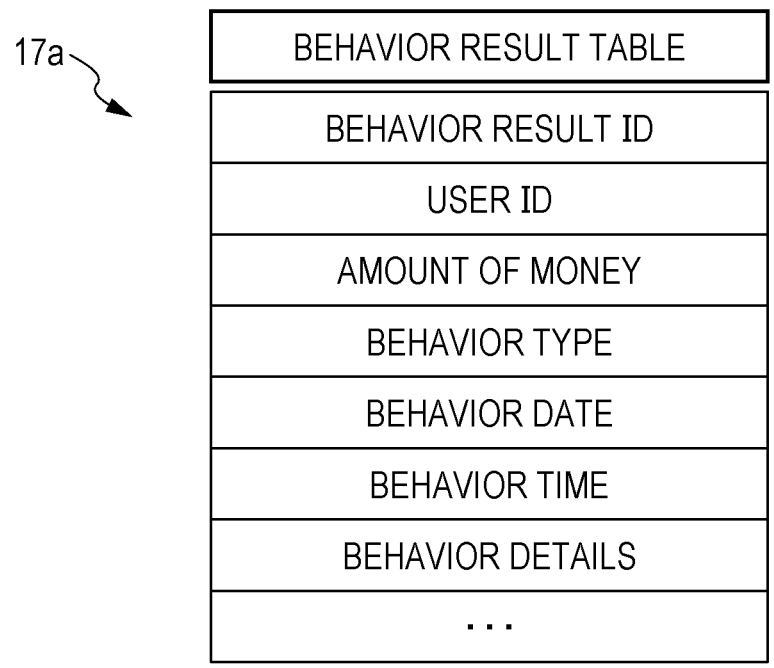
FIG. 11 is a diagram illustrating an outline of an example of a data configuration of a behavior result table included in a behavior history DB in an embodiment of the present invention.

FIG. 11 is a diagram illustrating an outline of an example of a data configuration of a behavior result table included in the behavior history DB 17 in the present embodiment. A behavior result table 17*a* is a log table that accumulates result/content of the behavior (consumption behavior) performed by the user 3 as a history. For example, the table includes items such as a behavior result ID, a user ID, an amount of money, a behavior type, a behavior date, a behavior time, and behavior details.

The item of the behavior result ID holds ID information for uniquely identifying a target behavior result. The item of the user ID holds ID information for identifying the user 3 who has performed the behavior regarding the target behavior result. This value is registered in the above-described user master table 15*a*. The item of the amount of money holds information of the amount of money spent/acquired by the behavior regarding the target behavioral result. The item of the behavior type holds information such as a code value specifying the type of behavior regarding the target behavior result. This value is registered in the above-described user behavior table 15*b*. The items of the behavior date and the behavior time hold information of the date and time at which the behavior regarding the target behavior result has been performed. The item of the behavior details holds information regarding detailed content of the behavior regarding the target behavior result. For example, a sentence input by the user 3 may be registered or the behavior details may be specified by a code value or the like for classifying detailed content of the behavior.

Figure 12:
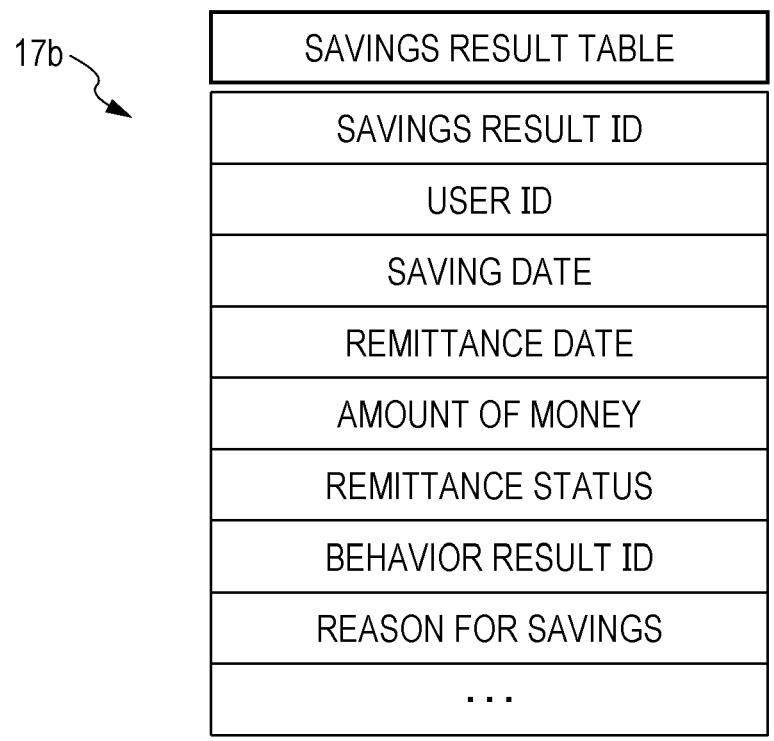
FIG. 12 is a diagram illustrating an outline of an example of a data configuration of a savings result table included in a behavior history DB in an embodiment of the present invention.

FIG. 12 is a diagram illustrating an outline of an example of a data configuration of a savings result table included in the behavior history DB 17 in the present embodiment. A savings result table 17*b* is a log table that when the user 3 has performed the consumption behavior and has performed savings to achieve the goal as the related processing, accumulates the result/content as a history. For example, the table includes items such as a savings result ID, a user ID, a saving date, a remittance date, an amount of money, a remittance status, a behavior result ID, and a reason for savings.

The item of the savings result ID holds ID information for uniquely identifying a target savings result. The item of the user ID holds ID information for identifying the user 3 who has saved money regarding the target savings result. This value is registered in the above-described user master table 15*a*. The items of the saving date and the remittance date hold information of a date on which savings regarding the target savings result has been performed and a date on which remittance or transfer to the savings account has been actually performed. The item of the amount of money holds information of the saving amount regarding the target savings result.

The item of the remittance status holds information such as a code value specifying a processing status of the remittance or transfer regarding the target savings result. The item of the behavior result ID holds ID information for specifying result information of the consumption behavior that has triggered the savings regarding the target savings result. This value is registered in the above-described behavior result table 17*a*. The item of the reason for savings holds information of a reason for saving money regarding the target savings result. For example, a sentence input by the user 3 may be registered or the reason for savings may be specified by a code value or the like for classifying a reason of savings.

Figure 13:
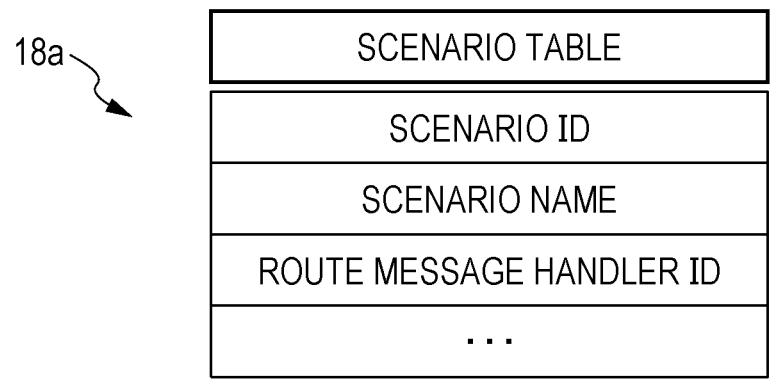
FIG. 13 is a diagram illustrating an outline of an example of a data configuration of a scenario table included in a scenario DB in an embodiment of the present invention.

FIG. 13 is a diagram illustrating an outline of an example of a data configuration of a scenario table included in the scenario DB 18 in the present embodiment. A scenario table 18a is a table that holds information of various scenarios for getting the content of the consumption behavior out of the user 3. For example, the table includes items such as a scenario ID, a scenario name, and a route message handler ID.

The item of the scenario ID holds ID information for uniquely identifying a target scenario. The item of the scenario name holds information of a display name given to the target scenario. The item of the root message handler ID holds ID information specifying a message handler regarding a first message (route message) in the target scenario.

Here, the message handler is provided for each message issued by the behavior information collection system 1 side in the scenario, and is a program module or data object for performing processing for outputting the message. In the present embodiment, the scenario is configured as a tree data structure in which messages (specifically, corresponding message handlers) are sequentially linked with development of conversations with the route message at head, and the linkage is appropriately branched according to the response content from the user 3. With the data structure, the content of the message issued by the behavior information collection system 1 side can be appropriately changed to flexibly configure a series of conversations according to the response content from the user 3.

Figure 14:
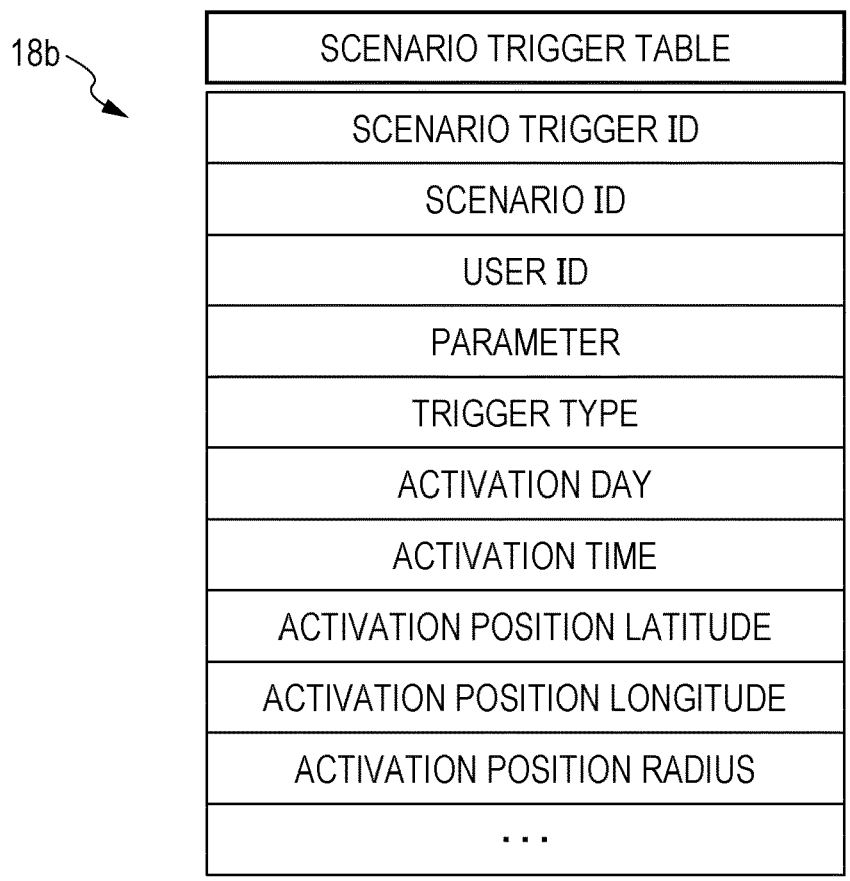
FIG. 14 is a diagram illustrating an outline of an example of a data configuration of a scenario trigger table included in a scenario DB in an embodiment of the present invention.

FIG. 14 is a diagram illustrating an outline of an example of a data configuration of a scenario trigger table included in the scenario DB 18 in the present embodiment. A scenario trigger table 18b is a table that holds setting content of the scenario trigger 33 that is the information of triggers for starting a conversation based on a scenario for each user 3. For example, the table includes items such as a scenario trigger ID, a scenario ID, a user ID, a parameter, a trigger type, an activation day, an activation time, an activation position latitude, an activation position longitude, and an activation position radius.

The item of the scenario trigger ID holds ID information for uniquely identifying a target scenario trigger. The item of the scenario ID holds ID information for specifying a scenario to be activated when the condition of the target scenario trigger is met. This value is registered in the above-described scenario table 18a. Further, the item of the user ID holds ID information for specifying the target user 3 for which whether the condition of the target scenario trigger is met is determined. This value is registered in the above-described user master table 15a.

The item of the parameter holds information of a value of an item set as a variable item in a message regarding the scenario corresponding to the target scenario trigger. For example, "450" in a message "usually you spend about 450 yen" illustrated in the lower left screen example in FIG. 5 corresponds to the information. The item of the trigger type holds information such as a code value specifying the type of the target scenario trigger. For example, whether to activate the scenario with a day of a week, a time zone, or the like as a trigger, whether to activate the scenario with a fact that the user 3 (mobile terminal 30) is located at a predetermined position as a trigger, whether to activate the scenario under a combined condition of the aforementioned conditions, or the like can be set.

The items of the activation day and the activation time hold information of a day of a week and a time serving as a condition of the target scenario trigger. Further, the items of the activation position latitude, the activation position longitude, and the activation position radius hold information of a range of location position of the user 3 (portable terminal 30) serving as a condition of the target scenario trigger. Here, the user 3 being located within a range of a circle with a position specified by values of the items of the activation position latitude and the activation position longitude as a center and a value of the item of the activation position radius as a radius is the condition. The condition is not limited to the circular range and can be set to a rectangular range with two positions as opposite angles.

Figure 15:
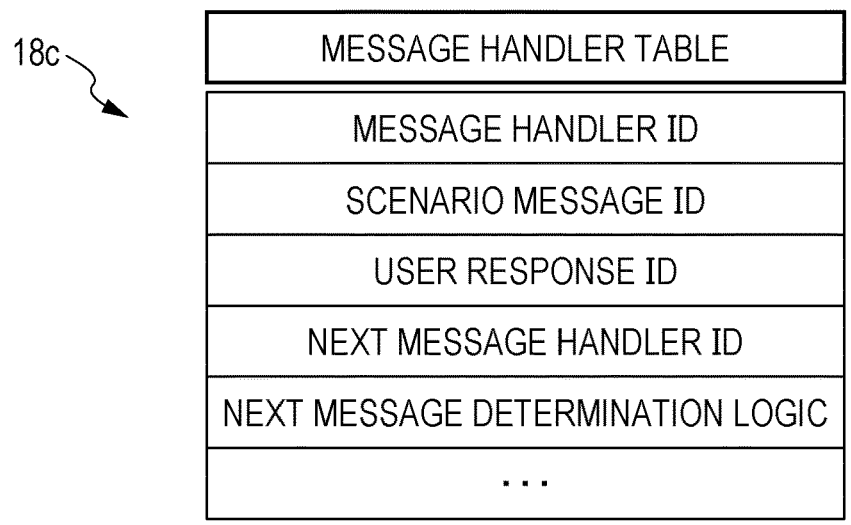
FIG. 15 is a diagram illustrating an outline of an example of a data configuration of a message handler table included in a scenario DB in an embodiment of the present invention.

FIG. 15 is a diagram illustrating an outline of an example of a data configuration of a message handler table included in the scenario DB 18 in the present embodiment. A message handler table 18c is a table that holds information of a message handler corresponding to a message issued by the behavior information collection system 1 side included in each scenario. For example, the table includes items such as a message handler ID, a scenario message ID, a user response ID, a next message handler ID, and a next message determination logic.

The item of the message handler ID holds ID information for uniquely identifying each message handler. The item of the scenario message ID holds ID information for specifying content of a message (a scenario message issued by the behavior information collection system 1 side) actually displayed by a target message handler. This value and the content of the corresponding scenario message are registered in a scenario message table to be described below. The item of the user response ID holds ID information for specifying information regarding answer/response from the user 3 to an inquiry made to the user 3 by the scenario message corresponding to the target message handler. This value and information regarding content of the user response are registered in a user response table to be described below.

The item of the next message handler ID holds ID information for identifying a message handler corresponding to a next message of the message corresponding to the target message handler in the tree structure of the scenario. In a case where the message is branched according to the content of the user response, ID information of message handlers respectively corresponding to messages of branch destinations is held as a list. The item of the next message determination logic holds information of a logic and a condition for determining a message of a branch destination in a case where the next message is branched according to the response content from the user 3 to the message corresponding to the target message handler. Content of the logic, a conditional expression, and the like may be held or information specifying a module or the like where the logic is mounted may be held.

Figure 16:
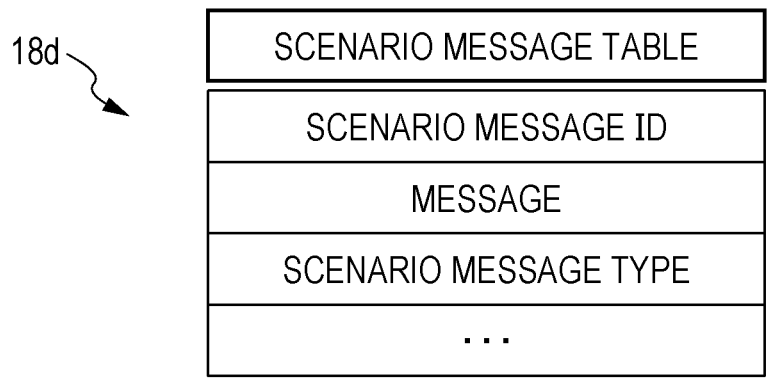
FIG. 16 is a diagram illustrating an outline of an example of a data configuration of a scenario message table included in a scenario DB in an embodiment of the present invention.

FIG. 16 is a diagram illustrating an outline of an example of a data configuration of a scenario message table included in the scenario DB 18 in the present embodiment. A scenario message table 18d is a table that holds content of a scenario message actually displayed by the behavior information collection system 1 side by each message handler included in each scenario. For example, the table includes items such as a scenario message ID, a message, and a scenario message type.

The item of the scenario message ID holds ID information uniquely identifying a target scenario message. The item of the message holds text information of content of the target scenario message. The item of the scenario message type holds information such as a code value specifying type/class of the target scenario message. This value is registered in a message type table to be described below. In the present embodiment, a plurality of patterns having different types of expression content is set to a scenario message conveying the same content and can be switched for each user 3.

Figure 17:
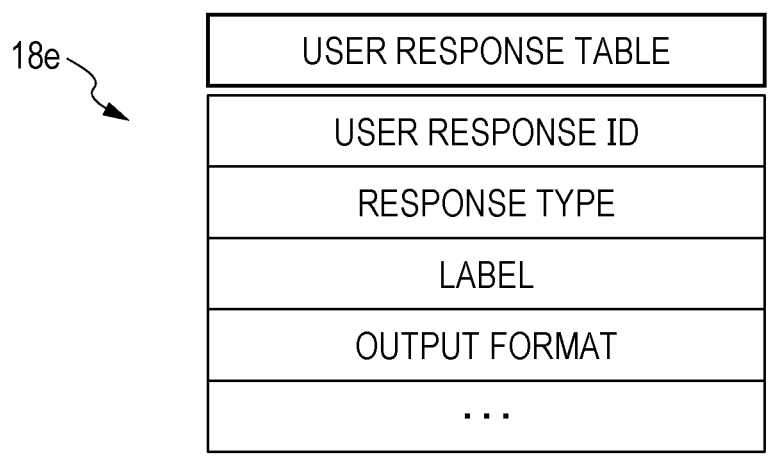
FIG. 17 is a diagram illustrating an outline of an example of a data configuration of a user response table included in a scenario DB in an embodiment of the present invention.

FIG. 17 is a diagram illustrating an outline of an example of a data configuration of a user response table included in the scenario DB 18 in the present embodiment. A user response table 18e is a table that holds information regarding answer/response from the user 3 to an inquiry made to the user 3 by a message issued by the behavior information collection system 1 side included in each scenario. For example, the table includes items such as a user response ID, a response type, a label, and an output format.

The item of the user response ID holds ID information uniquely identifying a target user response. The item of the response type holds information such as a code value classifying type/class of the target user response. The classification includes an alternative answer of "Yes" or "No", a selection from a larger number of options, a direct input of specific content or wordings, or the like. The item of the label holds a list of labels (text information) of options in the case of displaying two or more options in order to receive the target user response. The item of the output format holds information for specifying a format for displaying the options, an input form, or the like in order to receive the target user response.

Figure 18:
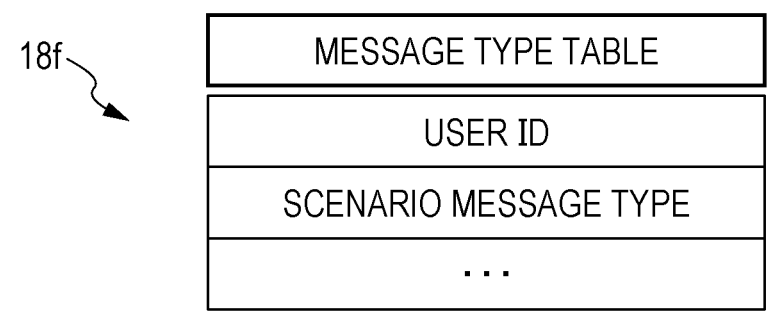
FIG. 18 is a diagram illustrating an outline of an example of a data configuration of a message type table included in a scenario DB in an embodiment of the present invention.

FIG. 18 is a diagram illustrating an outline of an example of a data configuration of a message type table included in the scenario DB 18 in the present embodiment. A message type table 18f holds information regarding a type of expression content and the like as a whole when displaying a scenario message of each user 3. For example, the table includes items such as a user ID and a scenario message type.

The item of the user ID holds ID information for specifying the target user 3. This value is registered in the above-described user master table 15a. The item of the scenario message type holds information such as a code value specifying a scenario message type set for the target user 3. By setting this value for each user 3, a positive expression or a negative expression, or a serious tone or a gentle tone, or the like can be switched even in a case of outputting a scenario message conveying the same content, as described above. Further, in addition to the expression and tone, whether setting the saving amount proposed to the user 3 to be larger (stricter) or smaller (gentler) for each behavior may be switched.

The data structures (items) of the tables illustrated in FIGS. 7 to 18 are merely examples, and other table configurations and data configurations may be used as long as the configurations are capable of holding and managing similar data.

As described above, the behavior information collection system 1 as one embodiment of the present invention associates the consumption behavior of the user 3 with the daily "savings" toward the goal set by the user 3, and can get and grasp the content of the consumption behavior for performing the "savings" when the user 3 has performed the consumption behavior with achievement of the goal by the "savings" as motivation.

That is, the mobile terminal 30 held by the user 3 constantly detects the information of the location and time of the user 3, and determines that some sort of consumption behavior has been performed in a case where the location and time meet the preset condition of the scenario trigger 33. Then, the conversation based on the scenario corresponding to the met scenario trigger 33 is started via the mobile terminal 30, and the information regarding the consumption behavior performed by the user 3 is inquired. By obtaining the response to the inquiry from the user 3, the content of the consumption behavior can be grasped in a natural way.

The invention made by the present inventor has been specifically described on the basis of the embodiment. However, the present invention is not limited to the above-described embodiment and various modifications can be made without departing from the gist of the invention. For example, the above-described embodiment has been described in detail in order to describe the present invention in an easy-to-understand manner and the present invention is not necessarily limited to those having all the described configurations. Further, another configuration can be added to/deleted from/replaced with part of the configurations of the above-described embodiment.

Further, part or all of the above-described configurations, functions, processing units, processing means, and the like may be realized by hardware by being designed as an integrated circuit or the like. Further, the above-described configurations, functions, and the like may be realized by software by a processor interpreting and executing a program that realizes the respective functions. Information of programs, tables, files, and the like that realize the functions can be stored in a recording device such as a memory, a hard disk, or a solid state drive (SSD) or a recording medium such as an IC card, an SD card, or a DVD.

Further, the above drawings illustrate control lines and information lines that are considered to be necessary for the description and do not necessarily illustrate all the mounted control lines and information lines. In fact, almost all the configurations may be considered to be mutually connected.

The present invention can be used for a behavior information collection system for a behavior that cannot be automatically grasped by an information processing system.

What is claimed is:

1. A behavior information collection system that collects information from a mobile terminal regarding behavior of a user, the behavior information collection system comprising:
 a goal database configured to hold goal information regarding a goal associated with the behavior of the user;
 a scenario database configured to hold a scenario regarding content of a conversation for inquiring about behavior information when the behavior has been performed, and trigger information of a scenario trigger including at least one condition of a time or a place of the mobile terminal serving as a trigger to start a conversation regarding the scenario; and
 a processor, connected to the goal and scenario databases, configured to, when at least one of the time detected in the mobile terminal held by the user and a location position of the mobile terminal meets the at least one condition of the scenario trigger associated with the user,
  acquire the scenario corresponding to the scenario trigger from the scenario database,
  engage the user in the conversation based on the scenario by displaying a message requesting a response from the user on the mobile terminal,
  record the behavior information based on the response received from the user, and cause the mobile terminal to display a prompt to the user of an action necessary for achieving the goal of the user based on the response.

2. The behavior information collection system according to claim 1,
wherein the location position of the mobile terminal that triggers the scenario is a retail location stored in the scenario database, and
wherein the scenario configures the processor to
request the response from the user to include an amount spent at the retail location, and
compare the amount spent with at least one previous amount spent at the retail location to determine the action included in the prompt for the user.

3. The behavior information collection system according to claim 2, further comprising a behavior history database configured to store the behavior information of the user, and wherein the scenario configures the processor instruct the mobile terminal to inquire of the user whether anything has been purchased at the retail location, instruct the mobile terminal, when the user replies that a purchase was made, to inquire an amount spent, compare the amount spent with an average amount spent at the retail location stored in the behavior history database, and instruct the mobile terminal to prompt the user according a difference between the amount spent and the average amount spent at the retail location.

4. The behavior information collection system according to claim 1, wherein the scenario database includes, for each of a plurality of scenarios, predefined conversation content of all of branch patterns for possible responses in the conversation to determine the behavior of the user.

* * * * *